Patented Apr. 27, 1954

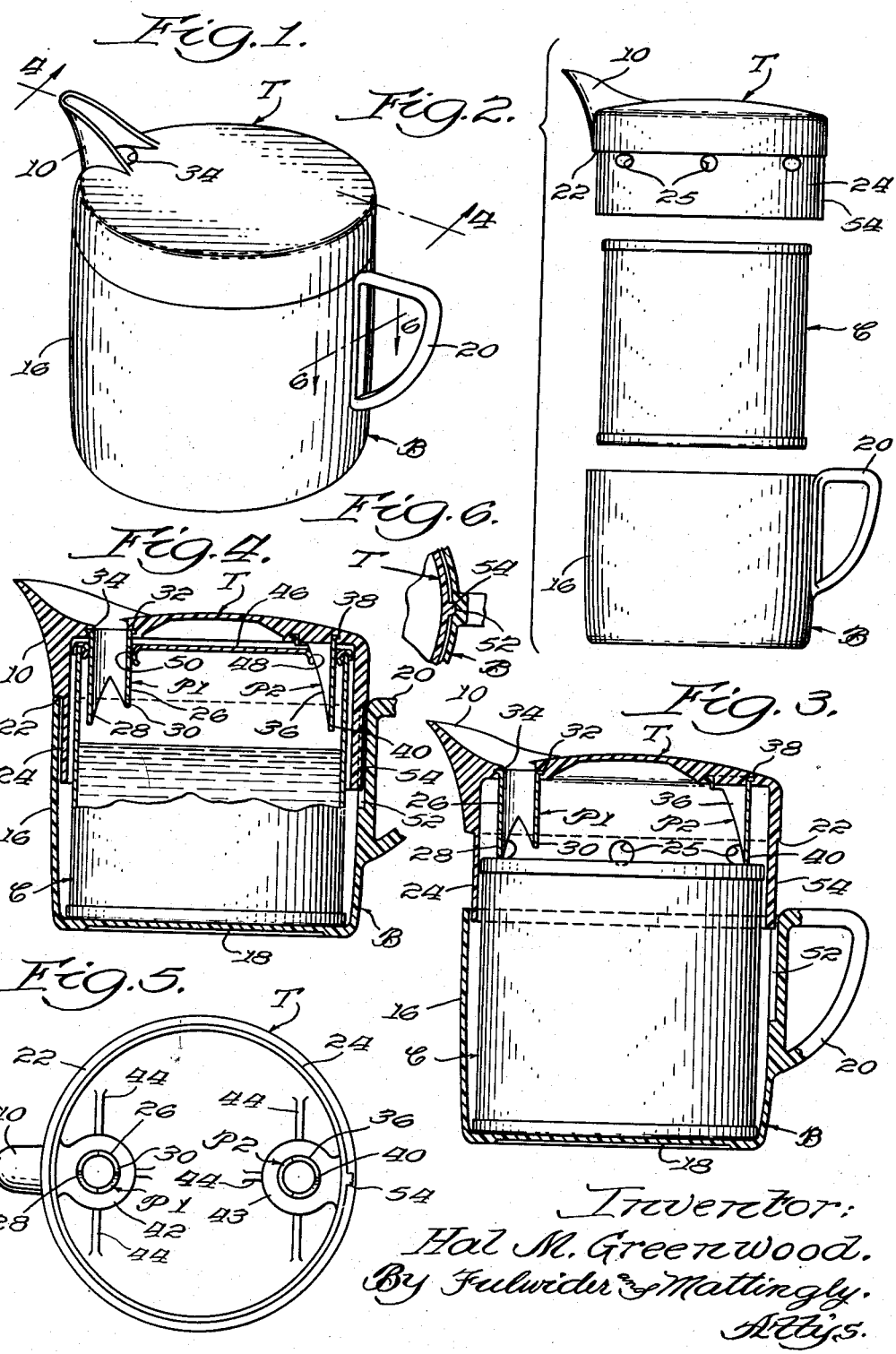

2,676,732

UNITED STATES PATENT OFFICE 2,676,732

PITCHER

Hal M. Greenwood, Long Beach, Calif., assignor to Hal Greenwood, Inc., Long Beach, Calif., a corporation Application February 16, 1952, Serial No. 271,942

1 Claim. (Cl. 222—86)

The present invention relates generally to pitchers, and more particularly to a pitcher adapted to contain a can while the contents of the can are poured from the spout of the pitcher.

The preferred embodiment of the present invention disclosed hereinafter is especially adapted for use with cans containing condensed milk. Condensed milk finds wide usage today for cooking purposes and for use with coffee and tea. Ordinarily the condensed milk can is made ready for use by piercing the top of the can to form a first hole for pouring purposes and a second hole to admit the atmosphere to the interior of the can whereby pouring may take place. The entire contents of the can are seldom emptied at once, but rather, these contents are used over a period of days, hence, these two holes are generally made of small diameter in order that impurities may be kept from entering the can.

Accordingly, it commonly occurs that the two holes become closed over by congealed milk between each occasion of use. For this reason it is required that the two holes be reopened each time that the milk is desired. Such a requirement is both time-consuming and annoying.

Additionally, the fact that these holes are of small diameter makes it difficult to pour the milk from the can in the desired quantity. Instead, either too much or too little milk is usually forthcoming from the pouring hole. A further disadvantage of the present day practice of utilizing condensed milk cans lies in the unattractive appearance of the opened can when it is placed upon the dining table. This is especially true where excess milk from the pouring spout has run down the side of the can.

In view of the foregoing disadvantages, it is a major object of the present invention to provide a novel pitcher adapted to encompass and conceal a can while the contents of the can are poured from the spout of the pitcher.

Another object of the present invention is to provide a pitcher of the nature described provided with a cover or top member and a base member, the top member being adapted to be applied to the base member after a can has been placed within the base member; the cover having means for automatically opening the can as the cover is applied to the base member.

It is a further object of the present invention to provide a pitcher of the nature described which completely hides the can it contains, and which is attractive in appearance.

Yet another object of the present invention is to provide a pitcher of the nature described which is of sturdy construction, and which can be fabricated from readily available materials.

It is yet a further object of the invention to provide a pitcher of the nature described which is simple in construction so that it may be produced and sold at low cost.

Other objects and advantages of the present invention will become apparent from the following description of a preferred embodiment thereof, taken in conjunction with the accompanying drawings, wherein:

Figure 1 is a perspective view of a preferred form of pitcher embodying the present invention;

Figure 2 is an exploded view in side elevation showing the pitcher of Figure 1 together with a can adapted to be received therein;

Figure 3 is a sectional view in side elevation showing the parts of the pitcher as the top member thereof is about to be urged downwardly onto the base member thereof; a can having been disposed within the latter;

Figure 4 is a side elevational view showing the parts of the pitcher when it is ready for the pouring operation;

Figure 5 is an elevational view of the underside of the top member of the pitcher; and, Figure 6 is a fragmentary horizontal sectional view of a detail of construction of the pitcher.

Referring now to the drawings, the preferred form of pitcher embodying the present invention comprises broadly a base member B adapted to receive a liquid-filled can C, and a top member T adapted to be applied to the base member. The top member T includes a pouring spout 10, as well as first and second punch means, P1 and P2, respectively, whereby upon application of the top member to the base member B, the top of the can C will be automatically opened whereby the contents thereof may be poured through the spout. In this manner the can may remain concealed during the time its contents are being emptied.

More particularly, the base member B is seen to be of an open-topped cylindrical configuration having upstanding side walls 16 and a bottom closure 18. A handle 20 is formed at one side whereby the pitcher may be lifted during the pouring operation. The diameter of the base member should be somewhat greater than that of the can C.

The top member T is seen to be formed at its mid-portion with an annular shoulder 22 adapted to rest upon the upper end of the base member B. The top member is also formed with annular side walls 24 which extend downwardly from this shoulder so as to be telescopically interfittable within the upper portion of the base member when the shoulder 22 is engaged with the upper end thereof, as shown in Figure 4.

A plurality of apertures 25 are shown formed in the side walls 24 for a purpose to be set forth hereinafter. Preferably, both the top member and the base member are formed of a suitable plastic material; however, other materials, as for example, metal, may likewise be utilized.

The first punch means P1, preferably comprises a metallic tubular element 26 which depends from the underside of the top member, and is formed on its lower portion with prongs 28 and 30. The tubular element 26 is shown formed with a flange 32 at its upper end, which flange may be molded into the plastic material forming the top member. It should be observed that the tubular element 26 is coaxial with the pour hole 34 formed at the base of the spout 10. The second punch means P2 is likewise formed of a metallic element 36 having a mounting flange 38 at its upper end and a prong 40 at its lower portion. As indicated in Figure 5, it is desirable to provide the top member with bosses 42 and 43 for receiving the mounting flanges 32 and 38 of the two punch means, and also with strengthening webs 44 adjacent these bosses.

In operation, the can C is first coaxially received within the base member B. Next, the top member is aligned with the base member as indicated in Figure 3, with the lower end of the prongs 28 and 40 resting upon the top 46 of the can. Thereafter, a sudden downward force is applied to the top member so as to urge it into the position shown in Figure 4; the punch means P1 and P2 piercing through the top 46 of the can. It should be noted that upon the application of the top member T to the base member B, the interior of the can is placed in communication with the atmosphere by means of the hole 48 formed in the top of the can by the punch means P2, and the apertures 25. Likewise, the interior of the can is placed in communication with the spout 10 by means of the hole 50 formed in the top of the can by the punch means P1, and the tubular element 26 thereof. Accordingly, the liquid contained within the can may be poured through the spout 10.

It will be understood that it is very desirable that the spout 10 be always positioned diametrically opposite the handle 20 during the pouring operation. For this reason, some means should be interposed between the base and top members for keying them against relative rotation. Although such means may assume various forms, preferably this means will comprise a vertical groove 52 formed in the base member adjacent the handle 20 and a complementary tongue 54 formed on the side wall 24 of the top member. With this arrangement, the lower end of the tongue 54 is inserted within the top of the groove 52 before the top member is urged downwardly. Then, after the top member has been urged to its lower position, the top member, base member and can will be positively locked against relative rotation.

Although communication between the interior of the can and the atmosphere is shown as being established through apertures 25, it will be understood that other means may be provided for this purpose. For example, one or more apertures may be formed in the top surface of the top member. It is believed, however, that the pitcher will present a more attractive appearance where the only break in its surface occurs at the pouring hole 34. Moreover, the chance of dust or dirt entering the can will be lessened where the apertures are formed in the manner shown in the drawings.

It will be apparent to those skilled in the art that other modifications and changes may be made with respect to the aforedescribed preferred embodiment without departing from the spirit of the invention and the scope of the appended claim.

I claim:

A dispensing unit for holding and dispensing canned liquids that comprises: a cylindrical open-topped base member adapted to receive a liquid-containing can having a puncturable top, said base member being formed with a slightly upwardly and outwardly tapering side wall to provide an annular-shaped space between the interior surface thereof and the exterior side wall surface of said can, and said base member having an outwardly disposed radially extending handle provided on the exterior thereof; an integrally formed annular top member having an intermediately positioned circumferentially extending body shoulder below which a continuous side wall extends adapted to be telescoped downwardly into the upper portion of said base member, said side wall having an aperture formed therein communicating with said annulus-shaped space when said side wall is in said telescoped position; a pouring spout extending outwardly from the upper surface of said top member; a tubular punch extending downwardly from said spout and in fluid communication therewith; a second punch depending downwardly from said top; and a vertically extending key formed in the side wall of said top in substantially the same vertical plane as said spout capable of slidably and loosely engaging a vertically extending keyway formed on the interior surface of said base member opposite said handle whereby said spout and handle are maintained in oppositely disposed positions upon application of sufficient force to said top to cause said punches to pass through the top of said can whereby the air pressure within said can is equalized with the atmospheric air pressure due to the opening in said can formed by said second punch being in communication with said aperture and said annulus-shaped space communicating with an air space formed between said loosely fitting key and keyway.

References Cited in the file of this patent
UNITED STATES PATENTS

| Number | Name | Date |
| --- | --- | --- |
| 2,159,897 | Karzenski | May 23, 1939 |
| 2,544,095 | Kower | Mar. 6, 1951 |
| 2,544,361 | Schmitkons | Mar. 6, 1951 |
| 2,547,311 | Genouese | Apr. 3, 1951 |
| 2,601,939 | Grob | July 1, 1952 |